(12) United States Patent
Merkin et al.

(10) Patent No.: US 8,443,184 B2
(45) Date of Patent: May 14, 2013

(54) SYSTEM AND METHOD FOR PERSONALIZING DEVICES

(75) Inventors: Aaron Merkin, Round Rock, TX (US); Fahd Pirzada, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 12/687,537

(22) Filed: Jan. 14, 2010

(65) Prior Publication Data

US 2011/0173427 A1   Jul. 14, 2011

(51) Int. Cl.
| G06F 9/00 | (2006.01) |
|---|---|
| G06F 15/177 | (2006.01) |
| G06F 9/44 | (2006.01) |
| G06F 9/445 | (2006.01) |
| G06F 9/455 | (2006.01) |

(52) U.S. Cl.
USPC ............ 713/100; 713/1; 713/2; 709/220; 717/171; 717/176; 718/1

(58) Field of Classification Search ............ 713/1, 2, 713/100; 709/220; 717/171, 176; 718/1
See application file for complete search history.

(56) References Cited

U.S. PATENT DOCUMENTS

| 7,162,628 | B2 | 1/2007 | Gentil et al. | |
|---|---|---|---|---|
| 7,293,170 | B2 | 11/2007 | Bowler et al. | |
| 7,346,766 | B2 | 3/2008 | Mackin et al. | |
| 7,401,182 | B2 | 7/2008 | Le et al. | |
| 7,953,833 | B2 * | 5/2011 | Ben-Shaul et al. | 709/222 |
| 7,962,496 | B2 * | 6/2011 | Gu et al. | 707/756 |
| 2005/0137981 | A1 | 6/2005 | Maes | |
| 2007/0189307 | A1 * | 8/2007 | Overby et al. | 370/395.52 |
| 2007/0192447 | A1 * | 8/2007 | Huynh et al. | 709/220 |
| 2009/0055918 | A1 | 2/2009 | Chang et al. | |
| 2009/0106752 | A1 * | 4/2009 | Balu et al. | 717/176 |
| 2010/0107113 | A1 * | 4/2010 | Innes et al. | 715/779 |

OTHER PUBLICATIONS

Windows Driver Model (WDM): Compatible drivers for Microsoft Windows operating systems, Apr. 15, 2002, available at http://www.microsoft.com/whdc/archive/wdmoverview.mspx.
WDM: Introduction to Windows Driver Model, May 22, 2002, available at http://www.microsoft.com/whdc/archive/wdm.mspx.

* cited by examiner

Primary Examiner — Stefan Stoynov
(74) Attorney, Agent, or Firm — Baker Botts L.L.P.

(57) ABSTRACT

A system and method for personalizing a device is disclosed herein. A user configures a plurality of settings associated with a device. Each setting is identified as a user setting or a platform setting. The user settings are stored in a personalization virtual object with the user. Platform settings are stored separately from the personalization virtual object. Software for personalizing a device provided on a computer readable medium is disclosed herein. The software comprises a code for execution on a central processing unit operable to configure a plurality of settings associated with a device by a user. The software identifies each setting as a user setting or a platform setting. The user settings are stored in a personalization virtual object associated with the user, and the platform settings are stored separately from the personalization virtual object.

24 Claims, 4 Drawing Sheets

SYSTEM AND METHOD FOR PERSONALIZING DEVICES

TECHNICAL FIELD

The present disclosure relates generally to the operation of computer systems and information handling systems, and, more particularly, to a system and method for personalizing devices.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include one or more central processing units coupled to a memory, and one or more devices that provide additional functionality. Such devices may include display devices such as monitors or graphics adapters, input devices such as mice, keyboard, or touch pads, or output devices such as sound cards or printers, to name a few. Device manufacturers continually design new devices for information handling systems to meet the changing needs of users. Various settings that control the operation of a device may be configured depending upon the other components of the information handling system, the environment in which the information handling system operates, or the preferences of the user.

SUMMARY

In accordance with the present disclosure, a system and method for personalizing a device is disclosed herein. A user configures a plurality of settings associated with a device. Each setting is identified as a user setting or a platform setting. The user settings are stored in a personalization virtual object with the user. Platform settings are stored separately from the personalization virtual object.

Software for personalizing a device provided on a computer readable medium is disclosed herein. The software comprises a code for execution on a central processing unit operable to allow a user to configure a plurality of settings associated with a device. The software identifies each setting as a user setting or a platform setting. The user settings are stored in a personalization virtual object associated with the user, and the platform settings are stored separately from the personalization virtual object.

An information handling system is disclosed herein. The information handling system has a central processing unit, a device coupled to the central processing unit, and a memory coupled to the central processing unit. The memory includes a code that when executed by the central processing unit is operable to allow a user to configure a plurality of settings associated with a device. The code is operable to identify each setting as a user setting or a platform setting. The user settings are stored in a personalization virtual object associated with the user. Platform settings are stored separately from the personalization virtual object. The code is operable to apply the platform settings to the device during a power-on initialization. Finally, the code is operable to apply the user settings from the personalization virtual object to the device during a logon by the user.

The system and method disclosed herein is technically advantageous because it allows for user-centric device settings to be preserved even after patches are applied to the device driver or operating system. A second advantage of the system and method disclosed herein is that user-centric device settings can be applied to systems that a user has not previously configured. A third advantage of the system and method disclosed herein is that the devices are personalized at run-time, which makes it easier to integrate new equipment, or to reassign existing equipment to new users. A fourth advantage of the system and method disclosed herein is that it enables a user to configure certain settings for a device once, and reuse those same settings on any other information handling system where the same device is available. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
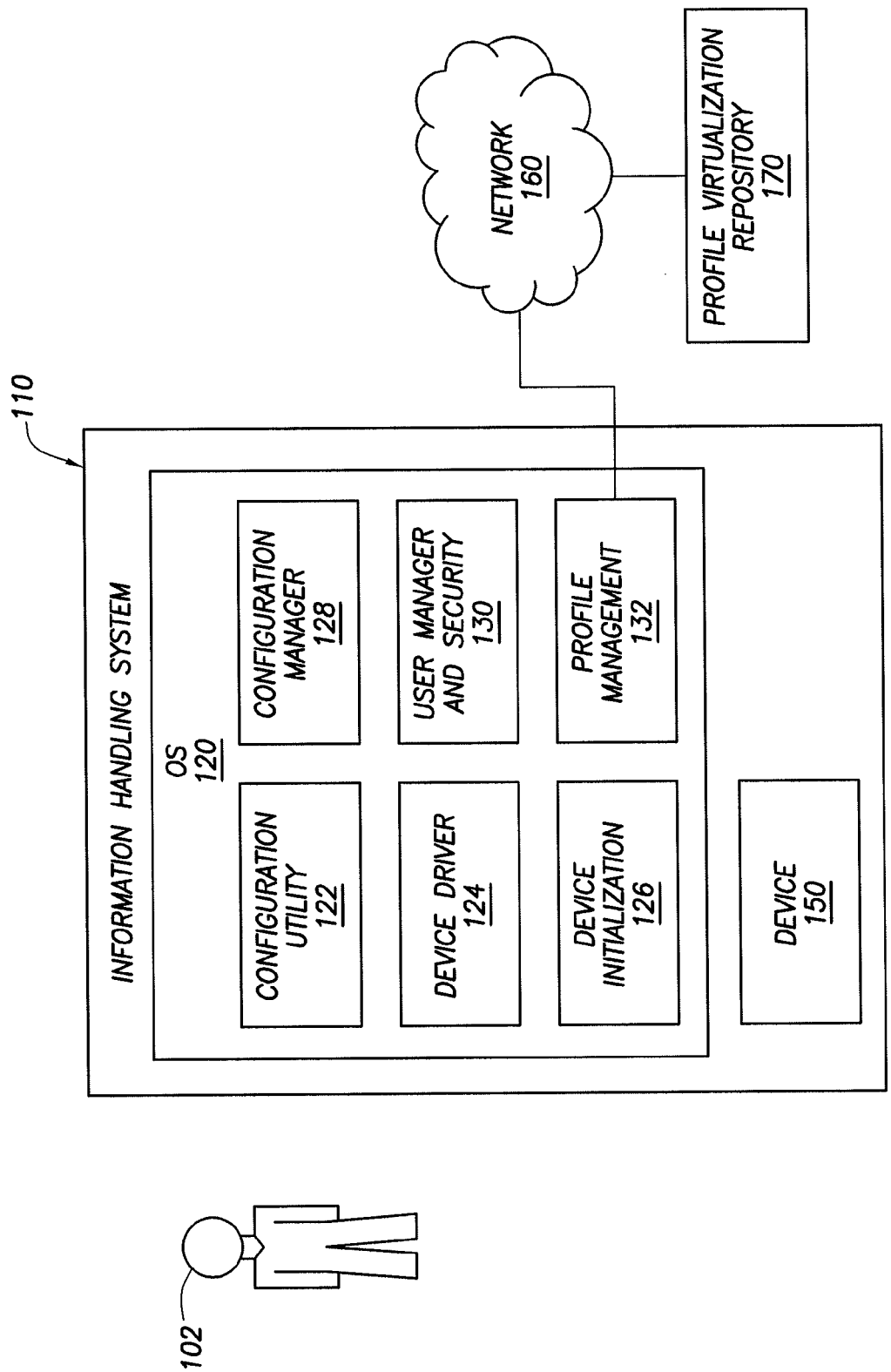
FIG. 1 is a diagram of various entities used to control and manage a device according to the system and method herein disclosed.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Various devices may be connected to an information handling system. A device can be part of an integrated chipset, such as a network interface card, a sound adapter, or a graphics adapter. A device may also be provided as a card that connects to an interface, such as peripheral component interconnect (PCI). Finally, a device may use an external form factor and connect to the information handling system using a universal serial bus (USB) or IEEE 1394 interface. Devices are not limited to being physical devices, and this term also includes virtual devices. Virtual devices are not physical devices, but appear to be physical devices to the operating system. Typically, a device manufacturer provides one or more device drivers designed to provide an interface between an operating system running on the information handling system and the device, which may not have existed at the time the operating system code was written. The device driver interacts with the operating system through an application programming interface (API) implemented by the operating system. The interface exposed by the API may be proprietary to the operating system, or may comply with a widely known standard for device drivers.

In addition to a device driver, the device manufacturer may supply a configuration utility. A configuration utility presents the user with various settings that alter the operation or personality of the device. For example, settings may alter the speed at which the device operates or performs a task, how it displays an image, or how it produces a sound. Some of the settings may be necessary for the device to properly operate. For example, in order for a graphics adapter to produce an image on an attached monitor, the graphics adapter must know at what resolution it should render the image. Other device settings may not be necessary for the device to properly function, but may alter the device's operation to better reflect the preferences of the user. The level of bass or treble for a sound adapter may not need to be adjustable to meet the needs of most users, but it may be desirable to allow the user to change these settings to satisfy their personal preferences.

The configuration utility allows a user to configure settings related to the device by providing a user interface. Any number of user interfaces are possible. In some implementations, a user may enter settings using a simple command line interface. Graphical user interfaces may also be used to show various options that may be selected or altered using a mouse or pointing device in addition to a keyboard. Touch pad or touch screen interfaces are increasingly common. The choice of user interface may depend on any number of factors depending upon the type of device, and the environment in which it is used. A configuration utility may present itself as a stand alone program that runs when the device is first installed or connected, similar to a setup wizard or software installation program. The configuration utility may also be implemented as a control panel, and may be grouped together by the operating system to present a dashboard of various device controls. In some instances, an operating system may provide a standard device driver or configuration utility for common devices.

Device settings can be classified as one of two types: user-centric settings (user settings) or platform-centric settings (platform settings). User settings are typically settings where the optimal setting varies upon a user's personal preferences, or the user's particular use of the device. An example of a user setting might be the choice of resolution used with the attached monitor. A graphics adapter and attached monitor may support several different resolutions in common. However, a particular user may prefer a lower-resolution display, while another user prefers a higher-resolution display. Platform settings are typically settings that are driven by other devices or components present in the information handling system, the software used with the device, or a combination of these factors. As a result, platform settings are typically hardware configuration driven and do not vary based upon the user presently operating the device. For example, if a device is connected to an information handling system using a USB connection, a setting that tells the device to use version 1.1 or version 2.0 of the USB specification will be determined by whether the information handling system supports one version or the other. When multiple users share an information handling system, it would be advantageous to track the user's preferred user settings, and to restore them whenever that user logs onto the system. At the same time, platform settings should be applied to the device regardless of the current user.

Like all software, it is sometimes necessary to supply a replacement device driver or configuration utility, or to "patch" the software. When a patch is applied, device settings may be lost, or restored to their default values. It would be advantageous to provide a way for settings to be retained, particularly user settings, even after the device driver or configuration utility is patched.

Shown in FIG. 1 is a diagram of various entities used to control and manage a device according to the system and method herein disclosed. An information handling system 110 may be connected to one or more devices, such as device 150. An operating environment or operating system (OS) 120 runs on the information handling system to control and coordinate the operation of the system. The operating system 120 includes not only the OS-provided kernel, but also may include third-party device or OS-provided configuration utilities, such as device configuration utility 122, or device drivers, such as device driver 124. The operating system 120 may provide a device configuration manager 128, user manager and security module 130, as well as a profile management agent 132. The information handling system may possess one or more interfaces to other systems, such as a network interface that provides a connection to network 160. Network 160 may use any type of connection technology, including Ethernet, fiber-optics, fibre channel, or wireless technologies. Network 160 is not limited to any particular connection protocol, and protocols that may be used include TCP/IP, or a storage networking protocol such as iSCSI, SAS, or fibre channel. A profile virtualization repository (PVR) 170 may be connected to the information handling system 110 via network 160. The profile virtualization repository 170 is an information handling system operable to store user settings as described in the system and method disclosed herein. The PVR 170 may be as simple as a file server where user settings are stored in encrypted files, a directory service such as a Microsoft Active Directory or LDAP directory, or it may be a database server.

Figure 2:
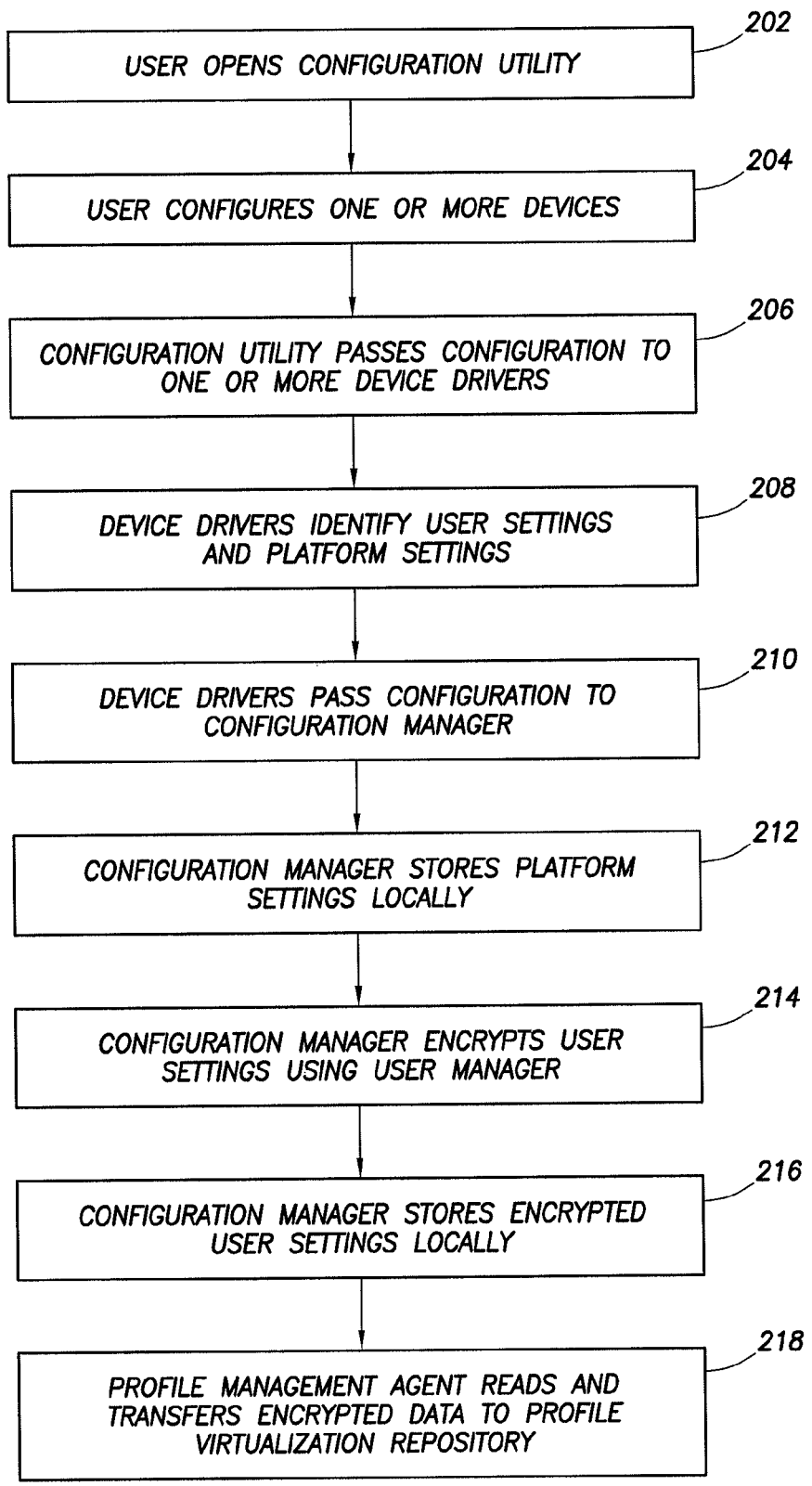
FIG. 2 is a flow diagram illustrating the process of configuring a device and capturing the configuration according to one embodiment of the system and method disclosed herein.

FIG. 2 is a flow diagram illustrating the process of configuring a device and capturing the configuration according to one embodiment of the system and method disclosed herein. For ease of description, the configuration process of a single device using a single configuration utility is depicted, however there is no limitation that requires the configuration utility only operate on a single device or single device driver at a time. At step 202, a user opens the device configuration utility 122 associated with a device 150. The configuration utility 122 provides a user interface that exposes one or more device settings that can be configured by the user 102. At step 204, the user 102 configures one or more settings of the device 150 using the configuration utility 122. The selections can be made using any suitable method of receiving user input. In one embodiment, a command line interface is used. In another embodiment, a graphical user interface and pointing device are used. At step 206, the configuration utility 122 passes the configured settings to the device driver 124.

At step 208, the device driver 124 identifies which settings are user settings and which settings are platform settings. The logic for identifying the type of setting is provided by code in the device driver 124. At step 210, the device driver 124 passes the configured settings, with an identification of each setting's type, to the device configuration manager 128. In a different embodiment, the logic for identifying the type of setting may be provided by code in the device configuration utility 122, or even in the device configuration manager 128. If the device configuration utility 122 performs the identification, then the setting type information would be included in the transfer of settings to the device driver 124, and from the device driver 124 to the device configuration manager 128. If the device configuration manager 128 performs the identification of user or platform settings, then only the settings would be passed from the configuration utility 122 to the device driver 124 and then to device configuration manager 128. In another embodiment, the logic for identifying the type of setting may be modified by a user, such as an administrator. The device configuration utility 122 or device driver 124 may be configurable by a user, typically an administrator, to change the identification logic by specifying whether a particular setting is treated as a user setting or a platform setting.

At step 212, the device configuration manager 128 stores the platform settings locally. The platform settings may be stored in any number of ways which include, but are not limited to, a registry, a directory such as an LDAP directory, a flat file in a text based format, or a binary file.

At step 214, the device configuration manager 128 creates a personalization virtual object (PVO) containing the user settings. The PVO may be in any number of formats, which may include the virtual hard disk format (VHD), the virtual machine disk format (VMDK), or the open virtualization format (OVF). The device configuration manager 128 may encrypt the PVO using an encryption key associated with the user 102. The user manager and security module 130 of the operating system 120 may be called by the device configuration manager 128 to perform the encryption. At step 216, the device configuration manager stores the encrypted PVO locally.

In one embodiment, the system and method disclosed herein ends at step 216. In another embodiment of the system and method disclosed herein, a profile management agent (PMA) 132 reads the encrypted PVO at step 218. The profile management agent 132 may decrypt the PVO directly, or it may call the user manager and security module 130 to perform the decryption. PMA 132 may store a full copy of the PVO in the profile virtualization repository 170. Alternatively, the PMA 132 may synchronize the PVO with an existing version of the PVO stored in PVR 170. When synchronization is used, different versions of the PVO may be stored as file deltas between the different versions of the PVO maintained in the PVR 170.

Figure 3:
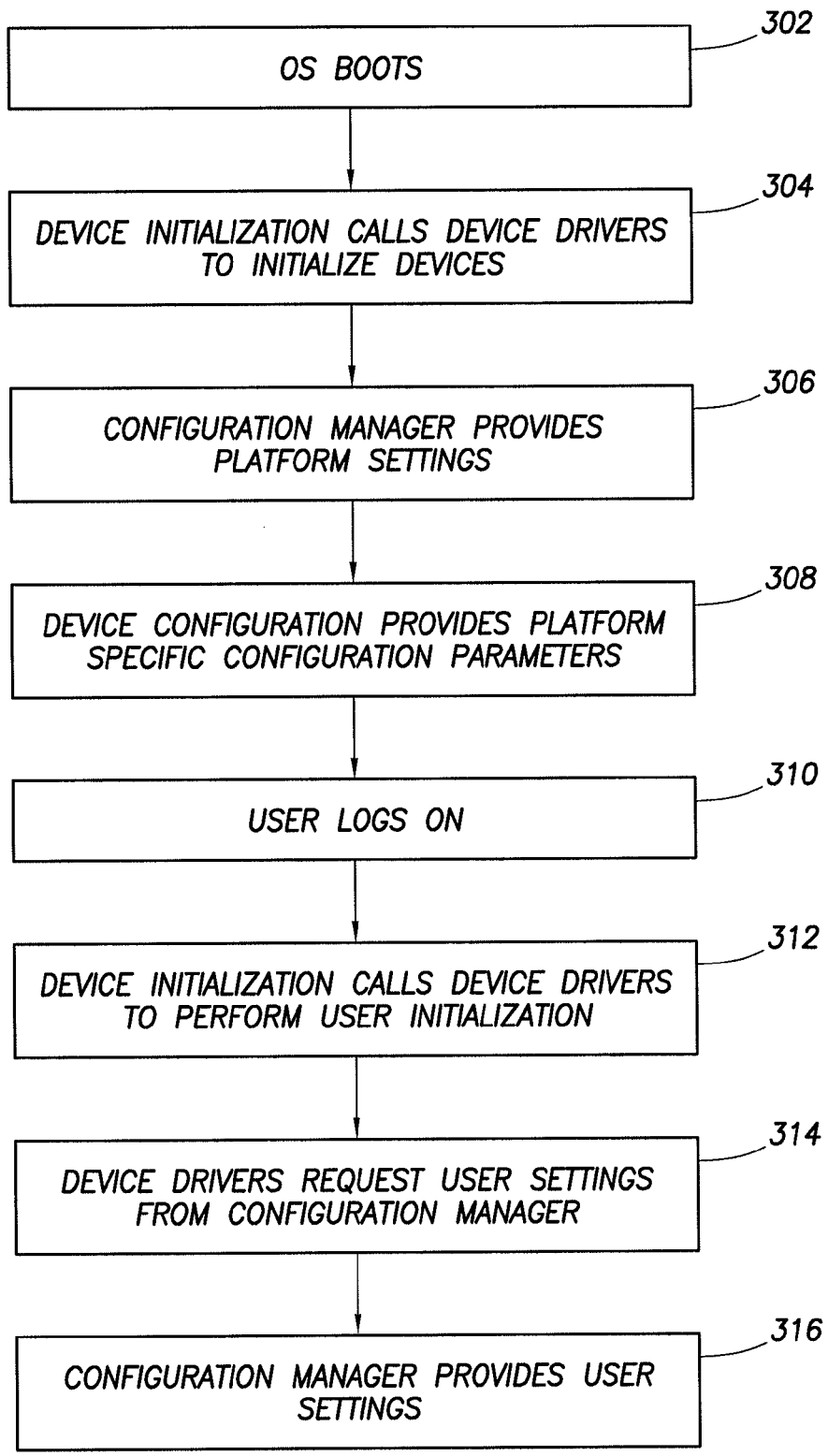
FIG. 3 is a flow diagram illustrating the process of personalizing a device according to an embodiment of the system and method disclosed herein.

FIG. 3 is a flow diagram illustrating the process of personalizing a device according to an embodiment of the system and method disclosed herein. At step 302, the information handling system 110 is powered-on or boots up. A power-on test procedure may be performed by the basic input output system (BIOS) before the operating system 120 begins its power-on initialization or boot process. During the power-on initialization of the operating system 120, a device initialization module or routine 126 calls various device drivers, such as device driver 124, to initialize the devices, such as device 150, at step 304. At step 306, the device driver 124 calls the device configuration manager 128 to request the platform settings associated with device 150. At step 308, the device configuration manager 128 provides the platform settings for device 150. The device driver 124 initializes device 150 using the platform settings. The system and method then waits until a user logs on.

At step 310, a user logon is detected and the device initialization module 126 is notified. At step 312 the device initialization module 126 calls the device driver 124 to perform user initialization of device 150. At step 314, device driver 124 requests the user settings associated with the logged in user and device 150 from the device configuration manager 128. In one embodiment, device configuration manager 128 retrieves the PVO from local storage, and decrypts the PVO using the user manager and security module 130.

In another embodiment of the system and method, the PMA 132 checks the version of the PVO in local storage and compares it with the version available in the PVR 170. If a newer version of the PVO is available from the PVR 170, then PMA 132 updates the local copy before the device configuration module 128 uses the local copy of the PVO.

Once the device configuration module 128 has retrieved the PVO, the device configuration module 128 provides the user settings to the device driver 124 at step 316. The device driver finishes the initialization of device 150 using the user settings associated with the logged on user.

Figure 4:
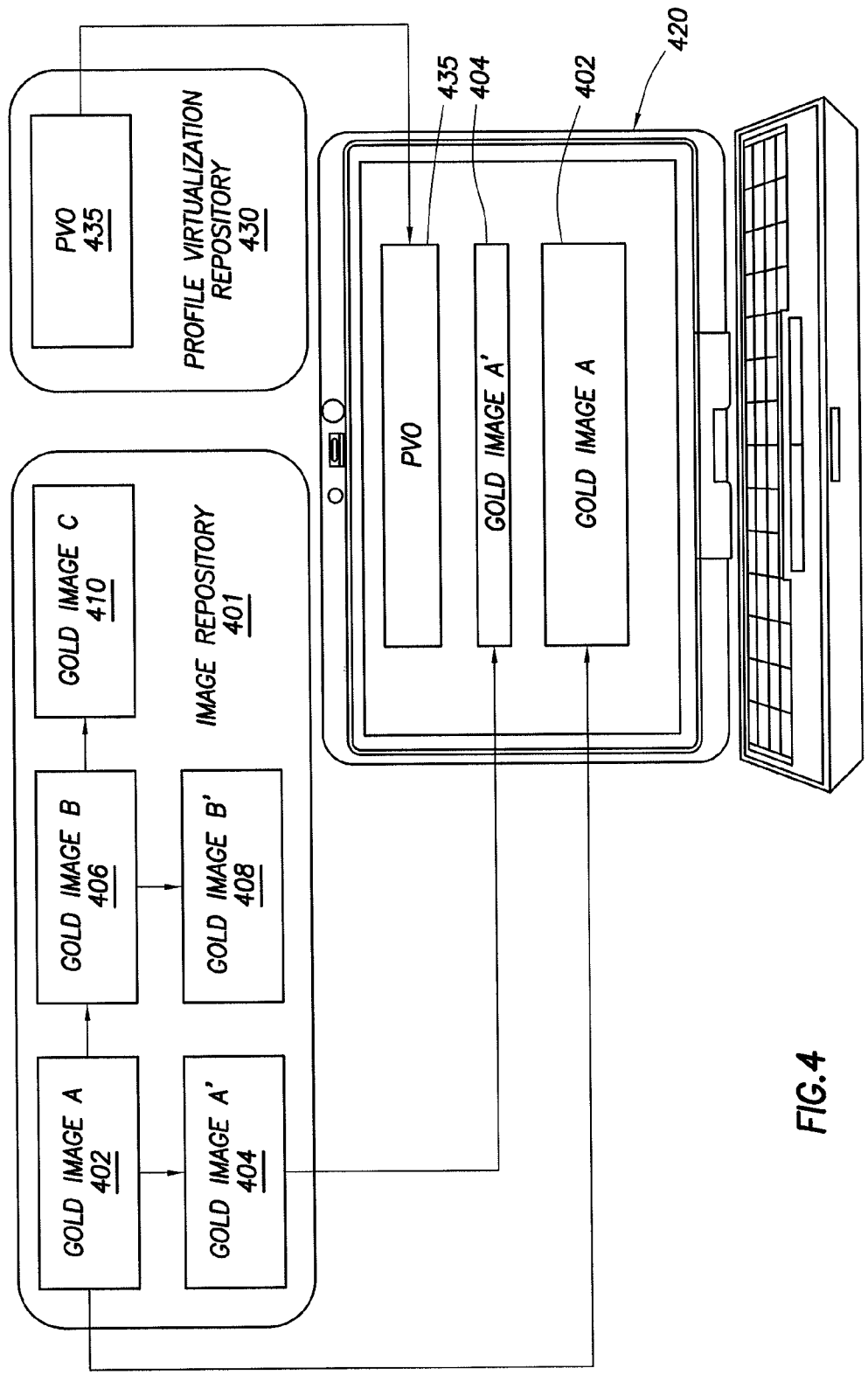
FIG. 4 illustrates the system and method disclosed herein when operating system streaming is used.

FIG. 4 illustrates the system and method disclosed herein when operating system streaming is used. In one implementation, Microsoft Active Directory may be used to specify the streaming and personalization policies to be applied on a per-user basis. An image repository 401 holds virtual hard disk images Gold Image A 402, Gold Image B 406, and Gold Image C 410. These images may contain an image of the operating system, various software applications, device configuration utilities, device drivers, software patches, or some combination of these. Differential images Gold Image A' 404 and Gold Image B' 408 include only differences between their respective base images and their updated versions. The profile virtualization repository 430 may contain a personalization virtual object (PVO) 435 associated with a particular user.

When the particular user logs on to information handling system 420, the streaming and personalization policy may specify that the particular user is to receive the latest Gold Image A, with device personalization applied. In that instance, the information handling system will receive a stream containing a complete Gold Image A, with the contents of Gold Image A' overlaid on top of the master gold image. Any platform settings that have been configured for devices connected to the information handling system 420 would then be applied to the composite image of Gold Image A and Gold Image A'. On top of these images, the personalization virtual object 435 would be applied so that the particular user's user settings will be applied to any devices connected to information handling system 420.

Although the present disclosure has been described in detail, it should be understood that various changes, substitutions, and alterations can be made hereto without departing from the spirit and the scope of the invention as defined by the appended claims.

What is claimed is:

1. A method of personalizing a device comprising:
   receiving an operating system image;
   configuring a plurality of settings associated with a device by a user;
   identifying each setting in the plurality of settings as a user setting or a platform setting;
   storing the user settings in a personalization virtual object associated with the user;
   storing the platform settings separately from the personalization virtual object and separately from the operating system image;
   applying the platform settings to the device and to the operating system image during a power-on initialization; and
   applying the user settings from the personalization virtual object to the device and to the operating system image during a logon by the user.

2. The method of claim 1 comprising:
   storing the personalization virtual object in a central repository; and
   retrieving the personalization virtual object from the central repository during the logon by the user.

3. The method of claim 2, wherein storing the personalization virtual object in the central repository comprises synchronizing the personalization virtual object with the central repository.

4. The method of claim 2, wherein a profile management agent stores or retrieves the personalization virtual object in the central repository.

5. The method of claim 4, wherein the profile management agent comprises a component of an operating system.

6. The method of claim 4, wherein the profile management agent comprises a discrete software component installed into an operating system.

7. The method of claim 2, wherein the personalization virtual object is encrypted with a key associated with the user.

8. The method of claim 1, wherein identifying each setting in the plurality of settings as a user setting or a platform setting is performed by a device driver.

9. The method of claim 1, wherein identifying each setting in the plurality of settings as a user setting or a platform setting is performed by a configuration utility.

10. The method of claim 1, wherein the user may modify an identification logic.

11. A non-transitory computer readable medium comprising a code for execution on a central processing unit, wherein when executed the code is operable to cause the central processing unit to:
    receive an operating system image;
    configure a plurality of settings associated with a device by a user;
    identify each setting in the plurality of settings as a user setting or a platform setting;
    store the user settings in a personalization virtual object associated with the user;
    store the platform settings separately from the personalization virtual object and separately from the operating system image
    apply the platform settings to the device and to the operating system image during a power-on initialization; and
    apply the user settings from the personalization virtual object to the device and to the operating system image during a logon by the user.

12. The non-transitory computer readable medium of claim 11, wherein the platform settings are stored and applied as a differential hardware image.

13. The non-transitory computer readable medium of claim 11, comprising a code operable to:
    store the personalization virtual object in a central repository; and
    retrieve the personalization virtual object from the central repository during the logon by the user.

14. The non-transitory computer readable medium of claim 13, wherein the code operable to store the personalization virtual object in a central repository and retrieve the personalization virtual object from the central repository during the logon by the user comprises a component of an operating system.

15. The non-transitory computer readable medium of claim 13, wherein the code operable to store the personalization virtual object in a central repository and retrieve the personalization virtual object from the central repository during the logon by the user comprises a discrete software component installed into an operating system.

16. The non-transitory computer readable medium of claim 13, wherein the code operable to store the personalization virtual object in a central repository comprises a code operable to synchronize the personalization virtual object with the central repository.

17. The non-transitory computer readable medium of claim 13, wherein a code comprising a profile management agent stores or retrieves the personalization virtual object in the central repository.

18. The non-transitory computer readable medium of claim 13, wherein the personalization virtual object is encrypted with a key associated with the user.

19. The non-transitory computer readable medium of claim 11, wherein the code operable to identify each setting in the plurality of settings as a user setting or a platform setting comprises a device driver.

20. The non-transitory computer readable medium of claim 11, wherein the code operable to identify each setting in the plurality of settings as a user setting or a platform setting comprises a configuration utility.

21. An information handling system comprising:
    a central processing unit;
    a device coupled to the central processing unit; and
    a memory coupled to the central processing unit comprising a code that when executed by the central processing unit is operable to cause the central processing unit to:
    receive an operating system image;
    configure a plurality of settings associated with a device by a user;
    identify each setting in the plurality of settings as a user setting or a platform setting;
    store the user settings in a personalization virtual object associated with the user;
    store the platform settings separately from the personalization virtual object and separately from the operating system image;
    apply the platform settings to the device and to the operating system image during a power-on initialization; and
    apply the user settings from the personalization virtual object to the device and to the operating system image during a logon by the user.

22. The information handling system of claim 21, comprising a code operable to:
    store the personalization virtual object in a central repository; and retrieve the personalization virtual object from the central repository during a logon by the user.

23. The information handling system of claim 21, wherein the code operable to identify each setting in the plurality of settings as a user setting or a platform setting comprises a device driver.

24. The information handling system of claim 21, wherein the code operable to identify each setting in the plurality of settings as a user setting or a platform setting comprises a configuration utility.

* * * * *